(12) United States Patent
Truong

(10) Patent No.: US 8,780,381 B2
(45) Date of Patent: Jul. 15, 2014

(54) METHODS FOR PRINTING MULTIPLE FILES AS ONE PRINT JOB

(75) Inventor: Duc Phu Truong, West Covina, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1465 days.

(21) Appl. No.: 12/027,717

(22) Filed: Feb. 7, 2008

(65) Prior Publication Data

US 2009/0201528 A1    Aug. 13, 2009

(51) Int. Cl.
*G06F 3/12*      (2006.01)

(52) U.S. Cl.
USPC .................. 358/1.15; 358/1.9; 358/1.16

(58) Field of Classification Search
USPC ............... 358/1.1–3.23; 715/200–277
See application file for complete search history.

(56) References Cited

U.S. PATENT DOCUMENTS

| | | | |
|---|---|---|---|
| 6,674,540 B1 | 1/2004 | Wiechers et al. | |
| 6,801,673 B2 | 10/2004 | Chao et al. | |
| 6,976,797 B2 | 12/2005 | Herron | |
| 6,978,299 B1 | 12/2005 | Lodwick | |
| 7,013,309 B2 | 3/2006 | Chakraborty et al. | |
| 7,020,837 B1 | 3/2006 | Kueny | |
| 7,286,250 B2 | 10/2007 | Kujirai et al. | |
| 2002/0021310 A1* | 2/2002 | Nakai et al. | 345/837 |
| 2002/0126306 A1* | 9/2002 | Chohsa et al. | 358/1.13 |
| 2002/0165882 A1* | 11/2002 | Zettel et al. | 707/530 |
| 2003/0068099 A1 | 4/2003 | Chao et al. | |
| 2005/0034070 A1* | 2/2005 | Meir et al. | 715/530 |
| 2006/0237526 A1* | 10/2006 | Mueller et al. | 235/379 |
| 2006/0268325 A1* | 11/2006 | Guang-Ming | 358/1.15 |
| 2007/0041031 A1* | 2/2007 | Kaneko | 358/1.14 |
| 2007/0086042 A1* | 4/2007 | Herold et al. | 358/1.15 |

OTHER PUBLICATIONS

Screen shots from Windows Picture and Fax Viewer running on a PC using the Windows XP Professional operating system, taken on Feb. 6, 2008.

\* cited by examiner

*Primary Examiner* — Benny Q Tieu
*Assistant Examiner* — Marcellus Augustin
(74) *Attorney, Agent, or Firm* — Chen Yoshimura LLP

(57) ABSTRACT

A method is disclosed for selectively printing multiple PDF files currently open in a PDF viewer (including editor) application. A GUI lists all PDF files currently open within the viewer. A user selects files from the list and specifies page ranges for the selected files. The PDF viewer submits data from the user-selected files to a printer as a single print job. In one implementation, the viewer generates a master PDF file from the selected files and transfers it to the printer. In another implementation, the viewer interprets the PDF data in the selected files into PDL data and transfers it to the printer. In another implementation, the viewer generate a separate PDF file containing selected data for each open PDF file, composes a job ticket using the generated PDF files and transfers the job ticket and the generated PDF files to the printer.

22 Claims, 3 Drawing Sheets

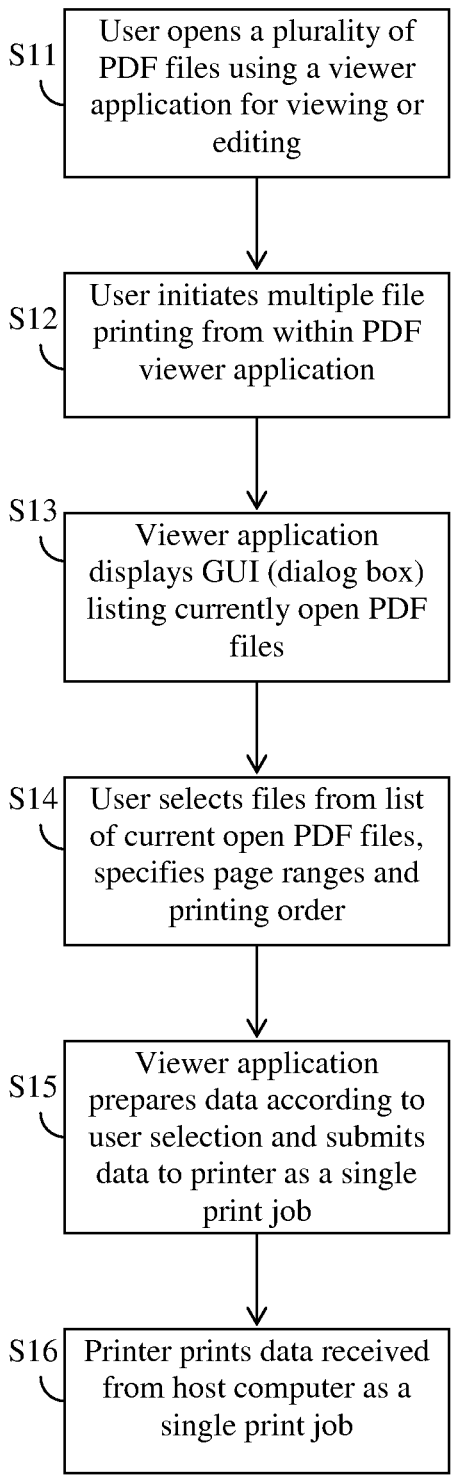
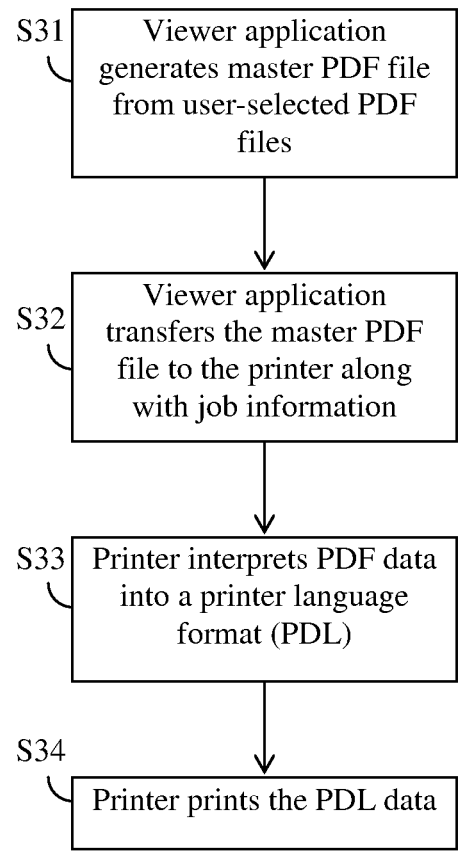
Fig. 3
Fig. 1

METHODS FOR PRINTING MULTIPLE FILES AS ONE PRINT JOB

BACKGROUND OF THE INVENTION

1. Field of the Invention

This invention relates to methods of printing files from a computer, and in particular, it relates to methods of printing multiple files as a single print job.

2. Description of Related Art

Many existing PDF (Portable Document Format) viewer application software such as Adobe Acrobat Reader only allow users to print one PDF file at a time using a printer driver even though there may be more than one PDF file currently open in the PDF viewer application. Similarly, applications such as MS Word only allow the user to print one open file at a time.

Methods for assembling and printing compounded multiple documents have been described. For example, U.S. Pat. No. 6,674,540 describes a "system for assembling the various pieces of a complex document that may be created in different formats and/or by different document generating application programs, while preserving the integrity of those individual file formats, and printing the fully assembled complex document." (U.S. Pat. No. 6,674,540, Abstract.) This method involves "(1) arranging individual document files created by different document generating application programs . . . in the order that they will appear in the compound document and then (2) launching the corresponding document generating application program to print each file in the arranged order and thereby print the compound document." (Id.) U.S. Pat. Appl. Pub. 2006/0268325 describes a printer having a PDF batch file direct print function. U.S. Pat. Appl. Pub. 20070041031 describes a print managing method that manages a plurality of files created by at least one application program as one print unit, and sets usage restriction information to the print unit.

Some existing application programs allow the user to select multiple files from a file directory to print as one print job. For example, in the Windows Picture and Fax Viewer program, when the user choose a print function, a Photo Printing Wizard appears, which displays a thumbnail of each photo in the current directory, and allows the user to choose multiple photos to print.

SUMMARY

Embodiments of the present invention overcome limitations of existing PDF viewer or other applications by providing a method for printing some or of all currently opened files within an application as a single print job. Some embodiments of the present invention additionally allow including data contained in external files (i.e. files not currently open within the application) as part of the same print job.

An object of the present invention is to provide a method that allows the user to easily print multiple files that are currently open within an application as a single print job.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for printing multiple files, which includes: (a) a user selectively opening a plurality of files using a viewer application to view the files; (b) the user initiating multiple file printing; (c) the viewer application displaying a user interface, the user interface including a list of all files that are currently open in the viewer application, and including an input means allowing the user to select multiple files from the list of the currently open files; (d) the user selecting some or all of the currently open files using the user interface; (e) the viewer application submitting data from the user-selected files to a printer as a single print job; and (f) the printer printing the data received from the viewer application as a single print job.

In one embodiment, the files are PDF files containing PDF data, and step (e) includes: (e1) generating a master PDF file from the PDF data within the specified page ranges of the user-selected files; and (e2) transferring the master PDF file to the printer as the single print job. In another embodiment, step (e) includes: (e1) interpreting the PDF data within the specified page ranges of the user-selected files into data in a printer language format; (e2) transferring the data in the printer language format to the printer as the single print job. In yet another embodiment, step (e) includes: (e1) storing a PDF file for the specified page range of each of the user-selected files; (e2) composing a job ticket describing the print job, the job ticket including filenames of the stored PDF files; and (e3) transferring the job ticket and the stored PDF files to the printer as the single print job.

In another aspect, the present invention provides a method implemented by a viewer application for printing multiple files, which includes: (a) in response to first user inputs, opening a plurality of files for a user to view the files; (b) in response to a second user input, displaying a user interface, the user interface including a list of all files that are currently open in the viewer application, and including input means allowing the user to select multiple files from the list of the currently open files; (c) receiving third user inputs indicating a selection of some or all of the open files; and (d) submitting data from the user-selected files to a printer as a single print job.

In yet another aspect, the present invention provides a computer program product comprising a computer usable medium having a computer readable code embodied therein for controlling a computer, the computer readable program code configured to cause the computer to execute the above process for printing multiple files.

It is to be understood that both the foregoing general description and the following detailed description are exemplary and explanatory and are intended to provide further explanation of the invention as claimed.

BRIEF DESCRIPTION OF THE DRAWINGS

FIG. 1 illustrates a multiple file printing method according to an embodiment of the present invention.

FIGS. 3-5 illustrate alternative methods from printing multiple files as a single print job.

DETAILED DESCRIPTION OF PREFERRED EMBODIMENTS

Figure 6:
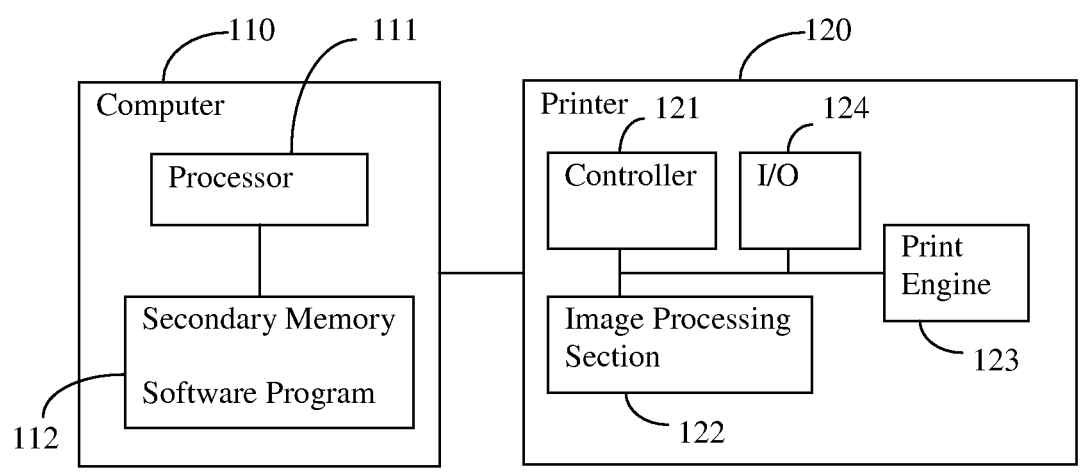
FIG. 6 illustrates a system including a host computer and a printer in which the multiple file printing method according to embodiments of the present invention can be implemented.

The multiple file printing methods described herein can be implemented in a data processing system which includes a host computer and a printer connected to the host computer. A typical structure of the data processing system is shown in FIG. 6. The host computer 110 includes a processor 111 and one or more secondary memories 112 for storing software programs and data (such as PDF files). The processor 111 includes a central processing unit (CPU), a random access memory (RAM) and a read only memory (ROM), and the CPU executes the software programs by reading out the same from the secondary memories to the RAM to carry out the methods described later in this disclosure. The printer 120 typically includes a controller 121, an image processing section 122, a print engine 123, and an input/output (I/O) section 124. The controller 201 may include a CPU, a RAM, and a ROM. The controller performs various processing functions, including interpretation of PDF data in some instances, rasterizing, etc. The image processing section 122 carries out various image processing on rasterized image data under the control of the controller 121, and sends the processed image data to the print engine 123. The print engine forms an image on a recording sheet based on the image data sent from the image processing section 122. The I/O section 124 performs data transfer with the host computer 110.

Various features according to embodiments of this invention may be implemented on the host computer 110 as a stand-alone PDF viewer/editor application, or as a plug-in module to an existing PDF viewer/editor or other applications capable of accepting plug-in software modules, such as Adobe Acrobat Reader, MS Word, etc. A stand-alone PDF viewer is used as an example in the descriptions below. It should also be understood that in the present disclosure, the term "PDF viewer application" broadly includes any application that has PDF viewing capability, including PDF editors.

Embodiments of the present invention provide a method for selectively printing some or all of currently open PDF files within a PDF viewer as a single print job. In addition, some embodiments of the present invention also allow including PDF data contained in external PDF files as part of the print job. From the standpoint of a printer, what constitutes one print job is a well-defined concept in the art. Each print job will have one "end of print job" recognized by the printer. Thus, methods according to embodiments of the present invention will generate a print job that contains contents from multiple PFD files but is recognized by the printer as a single print job.

Figure 2:
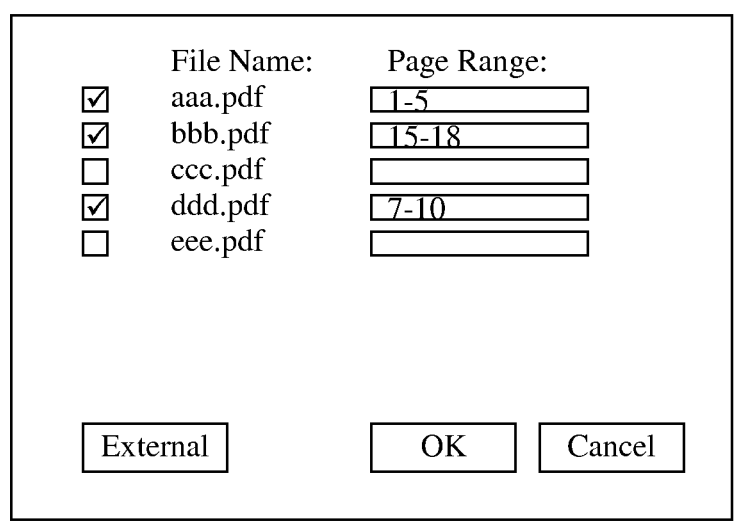
FIG. 2 illustrates a graphical user interface used in the multiple file printing method.

FIG. 1 illustrates the main steps of a multiple file printing method according to an embodiment of the present invention. After a user opens a plurality of PDF files using a PDF viewer application (step S11), the user initiates multiple file printing from within the viewer application (step S12). At this time, a plurality of PDF files are read out and opened within the viewer application so as to be viewed or edited. In other words, the plurality of PFD files are extracted from file locations in the secondary memories to RAM by the CPU executing the viewer/editor application. A user interface such as a graphical user interface (GUI) is displayed (step S13), which allows a user to select some or all of the open PDF files. The GUI may be in the form of a dialog box that lists all currently open files in the viewer application, with a selecting means (such as a check box associated with each file, an "add" button add a highlighted file, or any other suitable selecting means), for the user to select which PDF files are to be included in the multiple file print job. Preferably, the dialog box also provides input fields for the user to specify the page ranges of each PDF file to be printed. In addition, the dialog box may allow the user to specify an order in which the multiple PDF files are to be printed (a printing order), or to use a default printing order. An example of such a dialog box is shown in FIG. 2. Of course, other means of displaying and selecting the open files can be used; the dialog box can also include other items for specifying other settings.

In an alternative embodiment, the dialog box additionally allows the user to specify external PDF files (i.e. PDF files that are not open in the PDF viewer application at that time) that are to be included as a part of the multiple PDF print job for printing. To accomplish this, the dialog box additionally provides input section for the user to specify the external PDF files to be incorporated into the print job. For example, the dialog box may provide a "browse" button which creates a browse box for the user to select an external PDF file; the dialog box may support a file drag-and-drop operation which allows the user to drag an external PDF file from a file explorer application, such as Windows Explorer, and drop it into an area of the dialog box, etc. Once external files are selected to be part of the print job, the dialog box allows the user to specify page ranges for each external file to be printed.

Using the dialog box, the user selects, from among the open PDF files, the files to be printed, and specifies page ranges of the PDF files (optional) and printing order (optional) (step S14). The user may also select external PDF files to be included in the print job if the dialog box provides such a feature. Once the user has made the file selection (including the optional page range specification and printing order), the viewer application prepares the data according to the user selection, and submits it to the printer as a single print job (step S15). Here, in regard to the PDF files currently open, the viewer application uses data in the RAM instead of the static files stored in the secondary memories, so that the latest editions of the open file can be dynamically subject to print. The printer prints the data received from the host computer (submitted by the viewer application) as a single print job (step S16).

There are a number of ways to implement steps S15 and S16. The first implementation, shown in FIG. 3, can be employed when the printer has a PDF direct printing capability, i.e. when the printer controller is capable of accepting and processing PDF data for printing. Under this method, the viewer application generates, from the PDF data in the user-selected multiple PDF files, one master PDF file (step S31). If external PDF files are selected, the viewer application will also use the PDF data from these files when generating the master PDF file. A PDF file includes a plurality of blocks of data (commands or resources) and a cross-reference table typically located at the end of the PDF file. The cross-reference table lists all of the resources and commands contained in the PDF file, specifying for each of them an offset value from the beginning of the PDF file which represents the location of the resource or command within the PDF file. Methods for generating a master PDF file from multiple PDF files are known and are not described in detail here. Generally, such methods involve transferring pages of PDF data from the multiple PDF files into the master PDF file, and generating a cross-reference table for the master PDF file. This process can directly utilize the PDF data of the open files which resides in binary form in the computer's RAM (or the virtual memory). The PDF data in the master PDF file generated in step S31 is arranged according to the printing order of the multiple files, that is, the PDF data of the first page in the printing order appears first in the master PDF file.

The viewer application then transfers the master PDF file to the printer as a single print job, along with information describing the print job (referred to as "job information" here; also commonly referred to as a "job ticket" in some instances) (step S31). The job information specifies various conditions for the print job, such as paper requirements, finishing requirements, etc. The job information may be specified in various standard formats, such as Printer Job Language (PJL), Job Definition Format (JDF), etc., or non-standard formats.

The printer interprets the PDF data into data in a printer language format, commonly referred to as PDL (Page Description Language), such as PostScript or PCL (Printer Command Language) (step S32), and prints the data according to the job information (step S33). As a result, the multiple PDF files are printed as a single print job. This implementation does not require modification of the printer, so long as the printer has a direct PDF printing capability.

Optionally, the master PDF file generated in step S31 can be stored for later use (viewing or printing or editing). Thus, this implementation can also be used to generate a master PDF file from some or all of open PDF files without printing the master PDF file.

Figure 4:
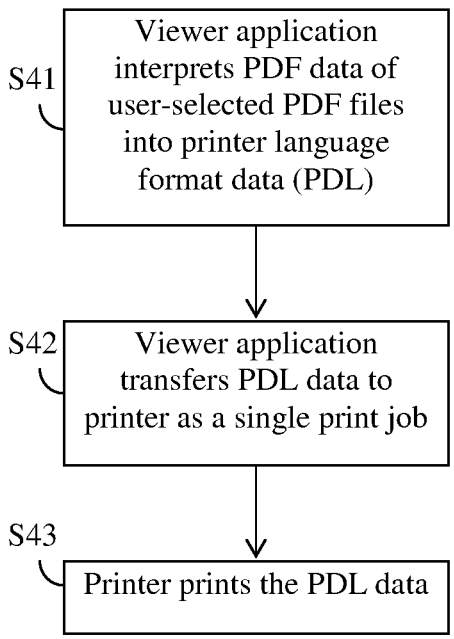

The second implementation of steps S15 and S16, shown in FIG. 4, can be employed without requiring the printer to have a PDF direct printing capability, i.e., the printer controller is not required to process PDF data for printing. Under this method, the PDF viewer application on the host computer interprets the PDF data of the user-selected PDF files that are open in the application into data in a printer language format (PDL) (step S41). The interpretation process can directly process the PDF data of the open files which resides in binary form in the computers RAM (or the virtual memory). If external PDF files are selected, the viewer application will also interpret the PDF data from these files. Only PDF data within the specified page range(s) of each selected file will be interpreted according to the printing order. The resulting printer language format data is transferred to the printer, along with the job information, as a single print job (step S42). The printer processes the printer language format data and prints the data (step S43). As a result, the multiple PDF files are printed as a single print job.

Figure 5:
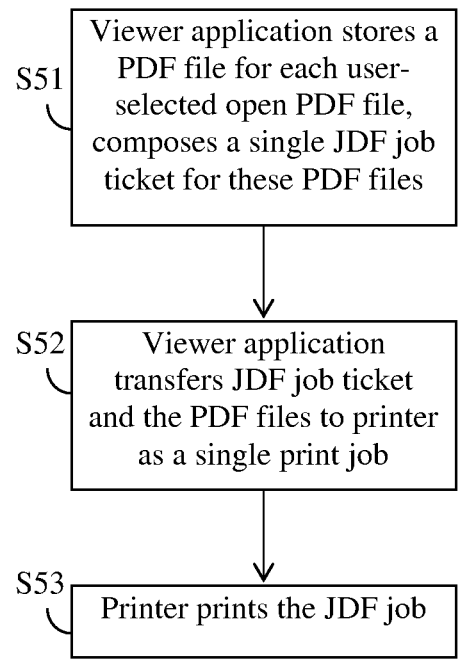

The third implementation of steps S15 and S16, shown in FIG. 5, also requires the printer to have a PDF direct printing capability. Under this method, the viewer application composes a job ticket for the user-selected open files (step S51). The job ticket describes the print job, including filenames of the files to be printed, as well as printing conditions for the print job such as paper requirements, finishing requirements, etc. In one example, the viewer application composes the job ticket using the Job Definition Format (JDF) standard. The JDF language can specify filenames representing the files to be printed, but cannot accept actual data of the file. Thus, in order to generate a JDF job ticket for PDF files that are open in the viewer application, when the content of the open files reside in the computer's RAM (or virtual memory), the PDF data of each open file (within the selected page range) is first written from the RAM into a PDF file stored in the computer's file system. It is preferable that such PDF files are stored in a work folder, which is assigned by the viewer application and is different from any folders storing the original static PDF files, so that the original static PDF files would not be overwritten. These PDF files are referred to when composing the JDF job ticket for the single print job. If external PDF files are selected, the viewer application will also include the filenames of such external PDF files when composing the job ticket. The viewer application then transfers the job ticket and the associated PDF files (the files generated in step S51) to the printer (step S52). The printer processes and prints the received JDF job (step S53). Note that this method requires the printer to be able to handle JDF data. Although JDF is used as an example in the above description, other suitable job description language that can compose a print job may be used.

An advantage of the third implementation, as compared to composing a JDF job ticket using static file names, is that it reduces the sizes of the files to be transferred to the printer when the printing page ranges selected for printing are relatively narrow.

In all of the embodiments described above, the viewer application prints multiple files that are already open in the viewer application, which are being viewed and/or edited. Compared to existing method that can only manipulate files in the computer's mass storage memory, referred to here as "static files," the present methods have the advantages that they are convenient and easy to use, as the user can view or edit the files and then print them directly. The ability to process the PDF already residing in the RAM or virtual memory, particularly in the case of the first and second implementations, makes it more efficient and therefore improves performance. For example, a conventional method that only operates on static files (such as that described in U.S. Pat. No. 6,674,540) would invoke a PDF interpreter which has to open PDF files and load them into RAM memory to interpreter them. The second implementation described above, on the other hand, interprets PDF data already in RAM.

Optionally, the viewer application may provide a smart cover page feature which allows the user to compose a descriptive cover page for the entire print job. The cover page is printed with the print job and outputted at the top of the stack of printed sheets. A typical print job cover page created by existing applications does not contain much information other than basic information such as the user name and the total number of pages of the print job. According to an embodiment of this invention, the cover page created by a PDF viewer application contains detailed information about the print job such as the filename of each PDF file within the print job, the author of each PDF file, etc. These pieces of information may be obtained by the viewer application programmatically from the PDF files based on the knowledge of how PDF files store such information. Another important piece of information the cover page may include is the time and date the print job was completely assembled by the PDF viewer application. This piece of information may be obtained programmatically by making one or more function call(s) to retrieve current time and date from the operating system. In addition to all data programmatically supplied by the viewer application, the cover page may also be edited by the user to add addition file management information such as the organization name of the user, the name of the print job which can be used to store the print job in a print job database, etc.

The multiple PDF file printing method according to embodiments of the present invention offers great PDF printing flexibilities because a user can combine pages from multiple PDF files that are open in the PDF viewer application, and print them as a single print job without first manually assembling them into a master PDF file.

In addition, the ability to include external PDF files as part of the multiple PDF file print job offers the advantage that the user need not manually load a PDF file into the PDF viewer application in order to print that PDF file as a part of the print job. This saves the users time because loading a PDF file into a PDF viewer usually takes a considerably long time, especially if the external PDF file is large in size or composed of complex rendered objects. Using the multiple PDF file printing method, the user can assemble the single print job without manually loading the external PDF files. Once the user finishes assembling the print job, the viewer application obtains the data from the external PDF files and accomplishes the printing without further user intervention.

Although multiple PDF files printing is used as an example in the description above, the method described above is generally applicable to the printing of multiple files in other file formats, such as MS Word, MS Excel, etc. For example, a plug-in module for the MS Word application may be provided to allow the user to select, from all open Word documents, multiple Word documents for printing as a single print job, and to select external Word files to be included in the same print job. The plug-in converts the Word format data from the multiple files into PDL data and transfers it to the printer as a single print job.

It will be apparent to those skilled in the art that various modification and variations can be made in the multiple PDF file printing method and apparatus of the present invention without departing from the spirit or scope of the invention. Thus, it is intended that the present invention cover modifications and variations that come within the scope of the appended claims and their equivalents.

What is claimed is:

1. A method implemented in a computer for printing multiple files, comprising:
    (a) a viewer application selectively opening a plurality of files, by reading the files from a storage memory into a random access memory (RAM) or a virtual memory of the computer, that allows a user to view the contents of the open files from the viewer application;
    (b) the view application receiving a user command to initiate multiple file printing;
    (c) the viewer application displaying a user interface, the user interface including a list of all files that are currently open in the viewer application, regardless of whether such files will be selected for printing or not, and including an input means allowing the user to select multiple files from the list of the currently open files;
    (d) the viewer application allowing the user to select some or all of the currently open files for printing from the list of all files that are currently open;
    (e) the viewer application submitting data from the user-selected files to a printer as a single print job; and
    (f) the printer printing the data received from the viewer application as a single print job; wherein the above steps are carried out in sequential order.

2. The method of claim 1, wherein the files are PDF (Portable Document Format) files containing PDF data.

3. The method of claim 1,
    wherein in step (c), the user interface further includes another input means allowing the user to specify a page range for each of the user-selected files, and
    wherein step (e) includes submitting data within the specified page ranges of the user-selected files to the printer.

4. The method of claim 3, wherein the files are PDF (Portable Document Format) files containing PDF data, and wherein step (e) comprises:
    (e1) generating a master PDF file from the PDF data within the specified page ranges of the user-selected files; and
    (e2) transferring the master PDF file to the printer as the single print job.

5. The method of claim 4, further comprising:
    (g) the viewer application storing the master PDF file on a storage medium.

6. The method of claim 4, wherein step (f) includes interpreting the data in the master PDF file into data in a printer language format.

7. The method of claim 3, wherein the files are PDF (Portable Document Format) files containing PDF data, and wherein step (e) comprises:
    (e1) interpreting the PDF data within the specified page ranges of the user-selected files into data in a printer language format;
    (e2) transferring the data in the printer language format to the printer as the single print job.

8. The method of claim 3, wherein the files are PDF (Portable Document Format) files containing PDF data, and wherein step (e) comprises:
    (e1) storing a PDF file for the specified page range of each of the user-selected files;
    (e2) composing a job ticket describing the print job, the job ticket including filenames of the stored PDF files; and
    (e3) transferring the job ticket and the stored PDF files to the printer as the single print job.

9. The method of claim 1, wherein in step (c), the user interface further includes another input means allowing the user to select files not open in the viewer application for inclusion in the single print job, and wherein step (d) further includes the user selecting one or more files not currently open in the viewer application.

10. A method implemented in a data processing apparatus by a viewer application for printing multiple files, comprising:
    (a) in response to first user inputs, the viewer application opening a plurality of files, by reading the files from a storage memory into a random access memory (RAM) or a virtual memory of the data processing apparatus, that allows a user to view the contents of the open files from the viewer application;
    (b) in response to a second user input, the viewer application displaying a user interface, the user interface including a list of all files that are currently open in the viewer application, regardless of whether such files will be selected for printing or not, and including input means allowing the user to select some or all of the currently open files for printing from the list of all files that are currently open;
    (c) the viewer application receiving third user inputs indicating a selection of some or all of the open files for printing; and
    (d) the viewer application submitting data from the user-selected files to a printer as a single print job;
    wherein the above steps are carried out in sequential order.

11. The method of claim 10, wherein the files are PDF (Portable Document Format) files containing PDF data.

12. The method of claim 10,
    wherein in step (b), the user interface further includes another input means allowing the user to specify a page range for each of the user-selected files, and
    wherein step (d) includes submitting data within the specified page ranges of the user-selected files to the printer.

13. The method of claim 12, wherein the files are PDF (Portable Document Format) files containing PDF data, and wherein step (d) comprises:
    (d1) generating a master PDF file from the PDF data within the specified page ranges of the user-selected files; and
    (d2) transferring the master PDF file to the printer as the single print job.

14. The method of claim 13, further comprising:
    (g) storing the master PDF file on a storage medium.

15. The method of claim 12, wherein the files are PDF (Portable Document Format) files containing PDF data, and wherein step (d) comprises:
    (d1) interpreting the PDF data within the specified page ranges of the user-selected files into data in a printer language format;

(d2) transferring the data in the printer language format to the printer as the single print job.

16. The method of claim 12, wherein the files are PDF (Portable Document Format) files containing PDF data, and wherein step (d) comprises:
   (d1) storing a PDF file for the specified page range of each of the user-selected files;
   (d2) composing a job ticket describing the print job, including filenames of the stored PDF files; and
   (d3) transferring the job ticket and the stored PDF files to the printer as a single print job.

17. The method of claim 10, wherein in step (b), the user interface further includes another input means allowing the user to select files not open in the viewer application for inclusion in the single print job, and
   wherein in step (c) the third user input further indicates a selection of one or more files not open in the viewer application.

18. The method of claim 10, further comprising:
   (e) generating data representing a cover page to be printed with the print job, the cover page including one or more of: a filename of each file within the print job, an author of each file, a time and date the print job was submitted by the computer application, and a name of the print job, wherein step (d) includes submitting the data representing the cover page to the printer as a part of the single print job.

19. A computer program product comprising a non-transitory computer usable medium having a non-transitory computer readable code embodied therein for controlling a computer, the computer readable program code being a viewer application and configured to cause the computer to execute a process for printing multiple files, the process comprising the steps of:
   (a) in response to first user inputs, the viewer application opening a plurality of files, by reading the files from a storage memory into a random access memory (RAM) or a virtual memory of the computer, that allows a user to view the contents of the open files;
   (b) in response to a second user input, the viewer application displaying a user interface, the user interface including a list of all files that are currently open in the viewer application, regardless of whether such files will be selected for printing or not, and including input means allowing the user to select some or all of the currently open files for printing from the list of all files that are currently open;
   (c) the viewer application receiving third user inputs indicating a selection of some or all of the currently open files for printing; and
   (d) the viewer application submitting data from the user-selected files to a printer as a single print job;
   wherein the above steps are carried out in sequential order.

20. The computer program product of claim 19, wherein in step (b), the user interface further includes another input means allowing the user to specify a page range for each of the user-selected files, and wherein step (d) includes submitting data within the specified page ranges of the user-selected files to the printer.

21. A computer program product comprising a non-transitory computer usable medium having a non-transitory computer readable code embodied therein for controlling a computer, the computer readable program code configured as a plug-in for a stand-alone viewer application to cause the computer to execute a process for printing multiple files, where the viewer application opens a plurality of files and allows a user to view the contents of the open files, the process comprising the steps of:
   (a) in response to a first user input, the viewer application displaying a user interface, the user interface including a list of all files that have been read by the viewer application from a storage memory into a random access memory (RAM) or a virtual memory of the computer and are currently open in the viewer application, regardless of whether such files will be selected for printing or not, and including input means allowing the user to select some or all of the currently open files for printing from the list of all files that are currently open;
   (b) the viewer application receiving second user inputs indicating a selection of some or all of the currently open files for printing; and
   (c) the viewer application submitting data from the user-selected files to a printer as a single print job;
   wherein the above steps are carried out in sequential order.

22. The computer program product of claim 21,
   wherein in step (a), the user interface further includes another input means allowing the user to specify a page range for each of the user-selected files, and
   wherein step (c) includes submitting data within the specified page ranges of the user-selected files to the printer.

* * * * *